US012226765B2

(12) United States Patent
Skoptsov et al.

(10) Patent No.: US 12,226,765 B2
(45) Date of Patent: Feb. 18, 2025

(54) MICROWAVE ASSISTED FLUIDIZED BED REACTOR

(71) Applicant: H QUEST VANGUARD, INC., Pittsburgh, PA (US)

(72) Inventors: George L. Skoptsov, Pittsburgh, PA (US); Aayush Mantri, Pittsburgh, PA (US); Vignesh Viswanathan, Pittsburgh, PA (US); Preet K. Jain, Pittsburgh, PA (US)

(73) Assignee: H QUEST VANGUARD, INC., Pittsburgh, PA (US)

( * ) Notice: Subject to any disclaimer, the term of this patent is extended or adjusted under 35 U.S.C. 154(b) by 262 days.

(21) Appl. No.: 17/663,821

(22) Filed: May 17, 2022

(65) Prior Publication Data

US 2022/0362731 A1 Nov. 17, 2022

Related U.S. Application Data

(60) Provisional application No. 63/189,548, filed on May 17, 2021.

(51) Int. Cl.
*B01J 8/18* (2006.01)
*B01J 8/38* (2006.01)
*B01J 19/12* (2006.01)

(52) U.S. Cl.
CPC ........... *B01J 8/1872* (2013.01); *B01J 8/1836* (2013.01); *B01J 8/388* (2013.01); *B01J 19/126* (2013.01);
(Continued)

(58) Field of Classification Search
CPC ..... B01J 8/00; B01J 8/18; B01J 8/1836; B01J 8/1872; B01J 8/20; B01J 8/22; B01J 8/24; B01J 8/38; B01J 8/384; B01J 8/388; B01J 19/00; B01J 19/08; B01J 19/088; B01J 19/12; B01J 19/122; B01J 19/126;
(Continued)

(56) References Cited

U.S. PATENT DOCUMENTS 5,063,329 A 11/1991 Okamoto
6,099,696 A 8/2000 Schwob et al.
(Continued)

FOREIGN PATENT DOCUMENTS

CA 2951878 A1 12/2015
CN 103818894 A 5/2014
(Continued)

OTHER PUBLICATIONS

International Search Report and Written Opinion mailed Oct. 13, 2022 in Application No. PCT/US22/72385.
(Continued)

*Primary Examiner* — Natasha E Young
(74) *Attorney, Agent, or Firm* — Fox Rothschild LLP

(57) ABSTRACT

System and methods for plasma treatment of a fluidized bed of particles are disclosed. The systems include an energy coupling zone configured to generate a plasma from microwave radiation and an interface element configured to propagate the plasma from the energy coupling zone to a reaction zone. The reaction zone is configured to receive the plasma, receive a plurality of reactant particles in a fluidization plane direction from a fluidization assembly positioned below the reaction zone, and form a product in presence of the plasma. The fluidization plane is substantially perpendicular to the propagated plasma.

30 Claims, 7 Drawing Sheets

(52) U.S. Cl.
CPC ............... *B01J 2208/00442* (2013.01); *B01J 2208/00548* (2013.01)

(58) Field of Classification Search
CPC .......... B01J 2208/00; B01J 2208/00008; B01J 2208/00017; B01J 2208/00433; B01J 2208/00442; B01J 2208/00548; B01J 2208/00557; B01J 2219/00; B01J 2219/00049; B01J 2219/00051; B01J 2219/00191; B01J 2219/00193; B01J 2219/00195; B01J 2219/00211; B01J 2219/00222; B01J 2219/00227; B01J 2219/00229; B01J 2219/00238; B01J 2219/08; B01J 2219/0873; B01J 2219/0881; B01J 2219/0886; B01J 2219/089; B01J 2219/0892
See application file for complete search history.

(56) References Cited

U.S. PATENT DOCUMENTS

| | | | |
|---|---|---|---|
| 6,156,256 | A | 12/2000 | Kennel |
| 6,207,023 | B1 | 3/2001 | Cha |
| RE37,853 | E | 9/2002 | Detering et al. |
| 6,689,192 | B1 | 2/2004 | Phillips et al. |
| 7,132,621 | B2 | 11/2006 | Kumar et al. |
| 7,591,989 | B2 | 9/2009 | Smiljanic et al. |
| 7,758,838 | B2 | 7/2010 | Hung et al. |
| 8,071,906 | B2 | 12/2011 | Smiljanic et al. |
| 8,486,363 | B2 | 7/2013 | Hung et al. |
| 8,486,364 | B2 | 7/2013 | Vanier et al. |
| 8,784,617 | B2 | 7/2014 | Novoselov et al. |
| 8,834,827 | B2 | 9/2014 | Simard et al. |
| 9,221,688 | B2 | 12/2015 | Hung et al. |
| 9,293,302 | B2 | 3/2016 | Risby et al. |
| 9,334,168 | B2 | 5/2016 | Fullerton et al. |
| 9,767,992 | B1 | 9/2017 | Stowell et al. |
| 9,812,295 | B1 | 11/2017 | Stowell |
| 9,862,602 | B1 | 1/2018 | Riso et al. |
| 9,862,606 | B1 | 1/2018 | Cook et al. |
| 9,987,611 | B1 | 6/2018 | Strohm et al. |
| 9,997,334 | B1 | 6/2018 | Anzelmo et al. |
| 2007/0029291 | A1 | 2/2007 | Boulos et al. |
| 2009/0031988 | A1 | 2/2009 | Shiraishi et al. |
| 2010/0048975 | A1 | 2/2010 | Uhm et al. |
| 2010/0093187 | A1 | 4/2010 | Lee et al. |
| 2010/0301212 | A1 | 12/2010 | Dato et al. |
| 2010/0314788 | A1 | 12/2010 | Hung et al. |
| 2012/0326803 | A1 | 12/2012 | Lee |
| 2013/0084237 | A1 | 4/2013 | Vanier et al. |
| 2014/0054504 | A1 | 2/2014 | Yoon et al. |
| 2014/0150713 | A1 | 6/2014 | Coe et al. |
| 2014/0170057 | A1 | 6/2014 | Huang et al. |
| 2015/0041309 | A1 | 2/2015 | Spitzl |
| 2015/0315476 | A1 | 11/2015 | Skoptsov et al. |
| 2016/0243518 | A1 | 8/2016 | Spitzl |
| 2017/0022064 | A1 | 1/2017 | Huang et al. |
| 2017/0113935 | A1 | 4/2017 | Pennington et al. |
| 2018/0099871 | A1 | 4/2018 | Tanner et al. |
| 2018/0138017 | A1 | 5/2018 | Stowell |
| 2019/0047865 | A1 | 2/2019 | Zeller et al. |
| 2020/0402768 | A1 | 12/2020 | Stowell et al. |

FOREIGN PATENT DOCUMENTS

| | | |
|---|---|---|
| RU | 120309 U1 | 9/2012 |
| WO | 2015189643 A1 | 12/2015 |
| WO | 2017196198 A2 | 11/2017 |

OTHER PUBLICATIONS

Menendez et al., Thermal Treatment of Active Carbons: A Comparison Between Microwave and Electrical Healing, International Microwave Power Institute, Journal of Microwave Power and Electromagnetic Energy, vol. 34, No. 3, 1999, pp. 137-143.
Dawson et al., A System to Investigate the Remediation of Organic Vapors Using Microwave-Induced Plasma with Fluidized Carbon Granules, Review of Scientific Instruments, vol. 80, No. 3, 2009, pp. 1-13.
Lebedev, Yu. A., Microwave Discharges at Low Pressures and Peculiarities of the Processes in Strongly Non-Uniform Plasma, Plasma Sources Science and Technology, vol. 24, Oct. 2015, pp. 1-39.
Jahanmiri et al., Naphtha Cracking Through a Pulsed DBD Plasma Reactor: Effect of Applied Voltage, Pulse Repetition Frequency and Electrode Material, Chemical Engineering Journal, vol. 191, May 2012, pp. 416-425.
Hunt et al., Microwave-Specific Enhancement of the Carbon-Carbon Dioxide (Boudouard) Reaction, The Journal of Physical Chemistry, 2013, vol. 117, pp. 26871-26880.
Khani et al., Study on the Feasibility of Plasma (DBD Reactor) Cracking of Different Hydrocarbons (n-Hexadecane, Lubricating Oil, and Heavy Oil), IEEE Transactions on Plasma Science, Sep. 2014, pp. 1-9.
Taghvaei et al., Hydrogen Production Through Plasma Cracking of Hydrocarbons: Effect of Carrier Gas and Hydrocarbon Type, The Chemical Engineering Journal, vol. 226, 2013, pp. 384-392.
Sekaran et al., Microwave Heating Characteristics of Graphite Based Powder Mixtures, International Communications in Heat and Mass Transfer, vol. 48, 2013, pp. 22-27.
Ahmed et al., Decomposition of Hydrocarbons to Hydrogen and Carbon, Applied Catalysis A: General, May 2009, pp. 1-24.
Rahimpour et al., Combination of Non-Thermal Plasma and Heterogeneous Catalysis for Methane and Hexadecane Co-Cracking: Effect of Voltage and Catalyst Configuration, Chemical Engineering Journal, vol. 219, Mar. 2013, pp. 245-253.
Lam et al., Pyrolysis Using Microwave Absorbents as Reaction Bed: An Improved Approach to Transform Used Frying Dil into Biofuel Product with Desirable Properties, Journal of Cleaner Production, vol. 147, Mar. 2017, pp. 263-272.
Torres et al., Hydrogen and Multiwall Carbon Nanotubes Production by Catalytic Decomposition of Methane: Thermogravimetric Analysis and Scaling-Up of Fe-Mo Catalysts, International Journal of Hydrogen Energy, Mar. 2014, pp. 3698-3709.
Omarov et al., On the Theory of Plasma Streamer Development, Bulletin of the Lebedev Physics Institute, 2009, vol. 36, No. 10, pp. 310-315.
Yamshchikov et al., Pulse Volume Discharges in High Pressure Gases, 12th International Conference on Gas Discharge Plasmas and Their Applications, Journal of Physics: Conference Series, vol. 652, 2015, p. 1-5.
Tatarova E. et al., Towards large-scale in free-standing graphene and N-graphene sheets, Scientific Reports, 7:10175, Aug. 31, 2017.
Tatarova E. et al., Microwave plasma based single step method for free standing graphene synthesis at atmospheric conditions, Applied Physics Letters, 103 134101 (2013).
Dato A. et al., Substrate-Free Gas-Phase Synthesis of Graphene Sheets, Nano Letters, 2008, vol. 8, No. 7, pp. 2012-2016.
Gonzalez-Aguilar J. et al., Carbon nanostructures production by gas-phase plasma processes at atmospheric pressure, Journal of Physics D: Applied Physics, vol. 40 (2007) pp. 2361-2374.
Tian M. et al., Synthesis of nanostructured carbons by the microwave plasma cracking of methane, Carbon vol. 51 (2013) pp. 243-248.
Karengin, Alexander G., Plasma Processes and Technologies, Tomsk, Publications of Tomsk Polytechnical University, 2009.

Side View

Top View

MICROWAVE ASSISTED FLUIDIZED BED REACTOR

CROSS REFERENCE TO RELATED APPLICATIONS

This application claims priority to U.S. Provisional Patent Application No. 63/189,548, filed May 17, 2021, the disclosure of which is incorporated herein by reference in its entirety.

STATEMENT OF GOVERNMENT-SPONSORED RESEARCH

This invention was made with government support through a subcontract under cooperative agreement number DE-FE0031866 from the Department of Energy. The government has certain rights in the invention.

BACKGROUND

Microwave plasmas driven by surface waves have been used to generate carbon nanostructures (including graphitic materials) by passing vaporized ethanol or other carbon feedstock through a microwave argon plasma environment. The microwave plasma clacks the carbon containing feedstock into carbon species which are subsequently recombined to form graphitic materials. However, existing methods are generally limited by low conversion yields, high energy requirements, operation at low pressure, and low feed rates, which limits scale-up for commercial operation. Conventional challenges of microwave plasma processes stem from the arrangement of the reaction zones with respect to the plasma zone, and lack of control over a continuous operation. Thus, microwave driven plasma apparatuses are fundamentally limited in feedstock throughput, maximum feedstock concentration, product quality, and conversion efficiency.

Hence, there is a need for a system and method that allows for scalable, continuous, and cheaper conversion of feedstock materials to value-added products, including graphitic materials.

SUMMARY

Systems and methods for plasma treatment of a fluidized bed of particles are disclosed. The systems may include an energy coupling zone configured to generate a plasma from microwave radiation and an interface element configured to propagate the plasma from the energy coupling zone to a reaction zone. The reaction zone may be configured to receive the plasma, receive a plurality of reactant particles in a fluidization plane direction from a fluidization assembly positioned below the reaction zone, and form a product in presence of the plasma. Optionally, the fluidization plane is substantially perpendicular to the propagated plasma.

In one or more embodiments, the energy coupling zone may include a radiation source for providing microwave radiation, and a discharge tube coupled to the radiation source. The discharge tube may be configured to receive a plasma forming material, and generate the plasma from the plasma forming material in the presence microwave radiation. Optionally, the discharge tube may extend at least partially within the interface element.

Optionally, a length of the interface element may be configured such that a head of the plasma is propagated within the reaction zone.

In various embodiments, the fluidization assembly may include a fluidization chamber configured for holding and fluidizing the plurality of reactant particles, a perforated distributor, and one or more fluidization gas ports for receiving a fluidization gas. Optionally, the one or more fluidization ports are in fluid communication with the perforated distributor such that the fluidization gas may fluidize static reactant particles. The one or more fluidization ports may be located on one or more walls of the fluidization chamber to provide a tangential flow of the fluidization gas. The perforated distributor may be a mesh or a fritted disc. Optionally, the fluidization assembly may also include a spouting tube configured to receive a spouting gas. The spouting tube can include a plurality of holes, and a spouting end configured to recirculate the plurality of reaction material particles in the reaction zone. The plurality of holes may be configured to receive the plurality of reaction material particles from a fluidized bed formed within the fluidization chamber.

In some embodiments, the system may also include an exhaust assembly comprising a conduit for receiving an exhaust gas from the reaction zone.

In various scenarios, a method for plasma treatment of a fluidized bed of particles may include generating a plasma from microwave radiation, propagating the plasma into a reaction zone, receiving a plurality of reactant particles in the reaction zone in a fluidization plane direction, and forming a product in presence of the plasma. The fluidization plane is substantially perpendicular to the propagated plasma.

In some embodiments, generating the plasma from microwave radiation may include generating a layered plasma that includes a higher temperature plasma surrounded by a lower temperature plasma.

Optionally, the method may include fluidizing static reactant particles in the fluidization plane using a fluidization gas and a perforated distributor. The gas flow velocity of the fluidization gas may be selected for controlling a residence time of the plurality of reactant particles within the plasma.

In some embodiments, one or more of the plurality of reactant particles may be recirculated into the reaction zone using a spouting gas.

In various embodiments, the methods may also include eliminating an exhaust gas from the reaction zone via an exhaust assembly.

In some other embodiments, the methods may include collecting sensor data, and using feedback control to control one or more process conditions. Optionally, the sensor data is collected from temperature sensors, pressure sensors, optical emission spectrometers, or gas chromatographs, and/or gas mass spectrometers.

BRIEF DESCRIPTION OF DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Plasma is a state of matter which contains electrons and at least partially ionized atoms and/or molecules (e.g., ions). Plasma may be, but not limited to, a thermal plasma and a non-thermal plasma. The thermal plasma is in local thermodynamic equilibrium where the electrons, ions, atoms, and molecules of the thermal plasma have a similar temperature. The non-thermal plasma is not in thermodynamic equilibrium.

Figure 1:
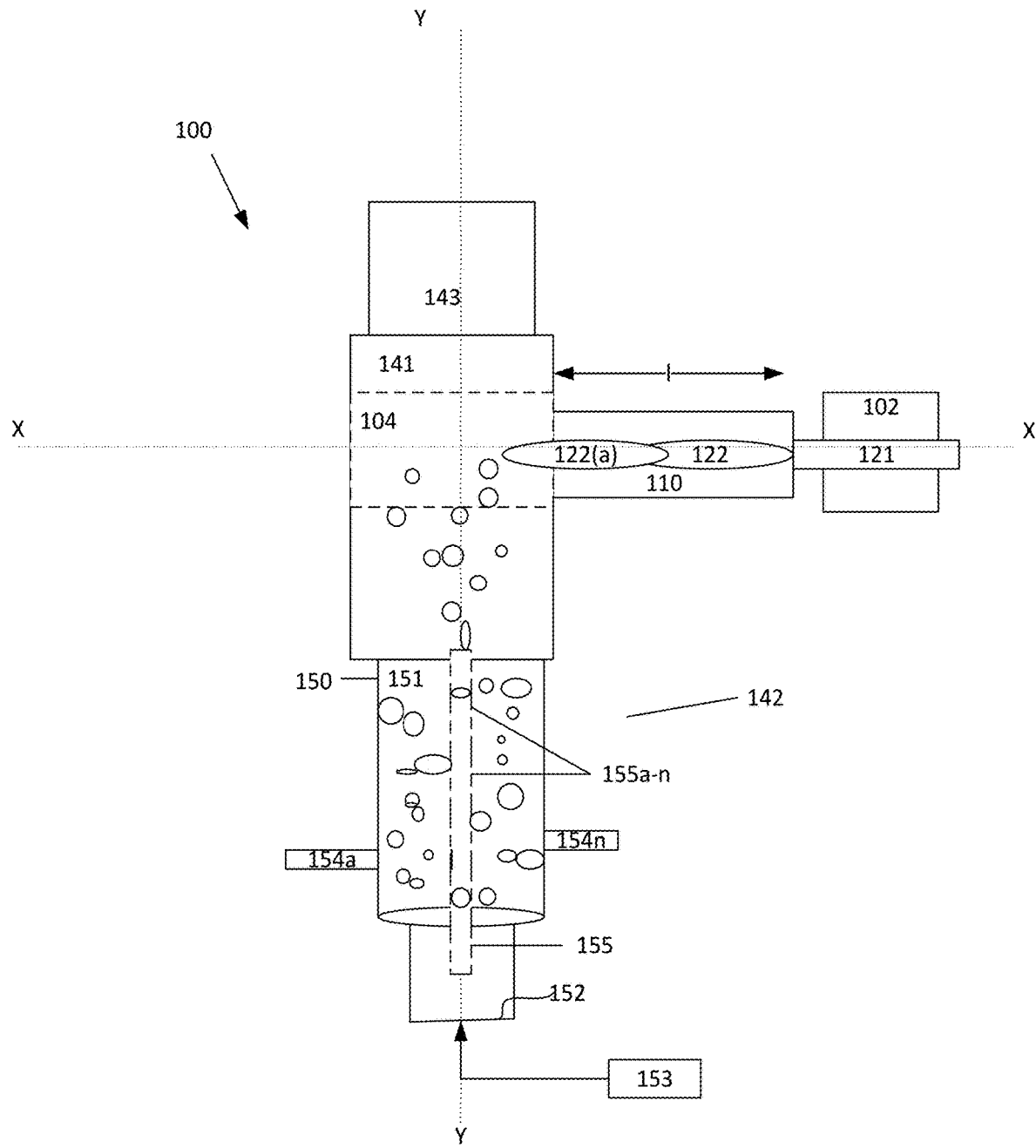
FIG. 1 depicts a block diagram illustrating an example of a system including a fluidized bed.

Referring now to FIG. 1, a block diagram illustrating a system 100 for processing a precursor material into a product utilizing a fluidized bed is shown. As shown in FIG. 1, the system 100 includes an energy coupling zone 102 that is coupled to a reaction zone 104 via an interface element 110, such that plasma from the energy coupling zone 102 is propagated in a direction that is approximately perpendicular to a fluidization plane in the reaction zone.

The energy coupling zone 102 may include any now or hereafter plasma forming systems and methods. For example, the energy coupling zone 102 may include radiation source(s) and waveguide(s) (or other coupling mechanism such as an antenna, coaxial, waveguide surfatron, a surfatron, or a surfaguide, etc.) that directs radiation from the radiation source (not shown here) into a discharge tube 121 (e.g., a coaxial element that includes two coaxially disposed tubes). The radiation source (e.g., a microwave generator) generates radio frequency (RF) radiation and/or microwave radiation, hereinafter referred to collectively as microwave radiation. The frequencies of the microwave radiation may be in the range from 36 megahertz (MHz) to 300 gigahertz (GHz), more preferably 40 MHz to 6 GHz, and most preferably 400 MHz to 3 GHz. For example, the microwave radiation frequency may be, but is not limited to, 896 MHz, 915 MHz and 2.45 GHz. The radiation source may be, but is not limited to, a magnetron. In an example embodiment, a 1.5-6 kW microwave magnetron operating at 2.45 GHz may be used, and the microwave power applied via a coaxial element maybe about 3 kW to about 6 kW. In another embodiment, a microwave magnetron operating at around 2.45 GHz may be coupled to a coaxial element and may apply power from about 10 kW to about 15 kW. In another embodiment, a microwave magnetron operating at around 896-905 MHz, 905-910 MHz and/or 910-915 MHz may be coupled to a coaxial element and may apply power of about 15 kW to about 100 kW, about 25 kW to about 85 kW, about 40 kW to about 70 kW, about 15 kW, about 30 kW, about 50 kW, about 75 kW, and/or about 100 kW. In some embodiments, the diameter of the coaxial tube (i.e., the discharge tube) may be determined as a function of the frequency of electromagnetic radiation propagating through it. Specifically, the dimensions the coaxial tube may determine the cut off frequency (where, cutoff frequency of an electromagnetic transmission line is the lowest frequency for which a mode will propagate in it), which in turn may determine the mode of propagation of the electromagnetic energy. Optionally, the following equation can be used to describe the cut-off frequency for a coaxial electromagnetic transmission element with inner diameter (d), outer diameter (D) and relative electromagnetic permittivity of Er between the coaxial tube elements.

$$f_c(\text{GHz}) = \frac{7.51393}{(D+d)\sqrt{E_R}}$$

for $D$ and $d$ in inches $$f_c(\text{GHz}) = \frac{190.85}{(D+d)\sqrt{E_R}}$$

for $D$ and $d$ in millimeters

D and d are chosen such that the cut off frequency (fc) is slightly higher than the characteristic frequency used in the system (e.g., 2.45 GHz). Based on this equation a wide range of "D" and "d" combinations are possible. For example, the outer tube diameter (D) may be about 1.75-1.95 inches, about 1.8 to about 1.9 inches, about 1.84 inches, about 1.85 inches, about 1.86 inches, about 1.87 inches, or the like, and the inner tube diameter ("d") may be about 0.7— about 0.8 inches, about 0.73 inches, about, 0.74 inches, 0.75 inches, about 0.76 inches, about 0.77 inches, or the like for $E_r$=1 to obtain a fc of 2.8 GHz which is slightly higher than an operation frequency of 2.45 GHz.

The microwave radiation may be used to generate and sustain a plasma within the discharge tube when a plasma forming material passes through the discharge tube 121 in the presence of microwave radiation. Generation of plasma using microwave radiation is described in, for example, U.S. Pat. No. 9,978,611, the disclosure of which is fully incorporated herein by reference. The discharge tube 121 may be a made of quartz, borosilicate glass, alumina, sapphire, or another suitable dielectric material. The discharge tube 121 may also be made of copper, aluminum, stainless steel, silver, gold, platinum, tungsten, titanium, or alloys containing these materials, or of other suitable conductive materials.

The plasma forming material may comprise virtually any material that can be used to generate plasma. For example, the plasma forming material may be, but is not limited to argon, hydrogen, helium, neon, krypton, xenon, carbon monoxide, carbon dioxide, nitrogen, nitrogen oxides, sulfuric oxides, hydrogen sulfide, synthesis gas, and water vapor (or water in the form of droplets, aerosols, or steam). It is understood that the plasma forming material may not be pure and may contain a variety of impurities as known in the art.

In various implementations, the discharge tube 121 is coupled to the interface element 110 such that the plasma formed inside the discharge tube 121 may be transmitted and/or extended into the interface element 110. Optionally, the discharge tube 121 may at least partially extend into the interface element 110. In an embodiment, the interface element 110 may be a conduit configured to propagate plasma into the reaction zone 104. Specifically, plasma 122 including a plasma head 122(a) extends into the interface element 110.

While FIG. 1 illustrates formation of plasma within the discharge tube, the disclosure is not so limiting, and in certain embodiments, at least some of the plasma may also be formed outside the discharge tube 121 such as within the interface element 110. The location of plasma formation may be configured to, for example, control formation and spread of the plasma within the reaction zone which in turn may control product formation, residence time of reaction materials within the plasma, reduction in arcing of the walls of the reaction chamber, temperature of a gas (e.g., fluidization gas), temperature of fluidized materials, gas velocity, system pressure, electron density, ion density, or the like. For example, the discharge tube 121 may transmit the microwave radiation and/or the plasma forming gas into the interface element 110 (with or without plasma formed within the discharge tube), and at least some of the plasma may be formed within the interface element 110. Additionally and/or alternatively, the interface element may receive the plasma forming gas from a separate input (not shown here) and the microwave radiation from the discharge tube 121 such that a plasma may be generated entirely within the interface element 110. Additionally and/or alternatively, the interface element 110 may also act as a conduit for conducting and emitting microwave energy into the reaction zone 104. In such scenarios, a plasma forming gas may be supplied into the reaction zone directly (inputs not shown here) such that the plasma may be formed within the reaction zone. Optionally, a combination of plasma forming locations may be selected including, without limitation, the discharge tube, the interface element, and the reaction zone.

Additionally and/or alternatively, different types of plasma may be formed at different locations by supplying different plasma forming gases at different locations. For example, a layered plasma may be formed that includes a first plasma (e.g., a plasma formed using a first plasma forming gas having a lower ionization constant such as hydrogen or argon) surrounded by a second plasma (e.g., a plasma formed using a second plasma forming gas having a higher ionization constant such as methane) which may control the formation and spread of the first plasma. This may be done by creating the first plasma before the second plasma (e.g., within the discharge tube) and providing the second plasma forming gas tangentially with respect to the first plasma (e.g., within the interface element or the plasma forming zone). The second plasma may also prevent arcing of the walls of the plasma chamber (i.e., prevent overheating of the walls of the reaction chamber that includes the reaction zone) by surrounding the highly ionized and higher temperature first plasma.

As shown in FIG. 1, the interface element is provided along a horizontal plane (shown by the X-X axis) and configured such that the plasma head 122(a) is propagated into the reaction zone in a direction that is approximately perpendicular (i.e., about 90°) to a fluidization plane Y-Y in the reaction zone 104. As used herein, the fluidization plane refers to the plane in which reaction materials (e.g., feedstock, carrier gas, catalyst, etc.) are introduced or fluidized within reaction zone (e.g., a generally vertical plane where the reaction materials are introduced into the reaction zone from the bottom). While not shown in FIG. 1, one or more energy coupling zones, discharge tubes, and/or interface elements may be provided at different and/or same angular positions with respect to the reaction zone and/or the fluidization plane.

While FIG. 1 illustrates the fluidization plane as being generally vertical, the disclosure is not so limiting. For example, in certain embodiments, the fluidization plane may be parallel to a ground plane, and the plasma plane may be generally vertical with the plasma flowing either in an upward direction and/or in a downward direction. Similarly other angles of the fluidization plane with respect to the ground plane are within the scope of this disclosure (with the plasma plane being offset by some angle with respect to the fluidization plane). Specifically, in some embodiments, the fluidization plane may be positioned at an angle to the gravity vector, i.e. not be generally vertical. The angle between fluidization plane and the gravity vector may be from about 0° to about 5°, or from about 5° to about 10°, or from about 10° to about 15°, or from about 15° to about 20°, or from about 20° to about 25°, or from about 25° to about 30°, or from about 30° to about 35°, or from about 35° to about 40°, or from about 40° to about 45°, or from about 45° to about 50°, or from about 50° to about 55°, or from about 55° to about 60°, or from about 60° to about 65°, or from about 65° to about 70°, or from about 70° to about 75°, or from about 75° to about 80°, or from about 80° to about 85°, or from about 85° to about 90°. In some embodiments, propagation of the plasma head 122(a) may not be approximately perpendicular to the fluidization plane Y-Y. For example, plasma may be propagated generally along the direction in which reaction materials are introduced or fluidized within the reaction zone. In some other examples plasma may be propagated generally counter to the direction in which reaction materials are introduced or fluidized within the reaction zone. The angle between the line of propagation of the plasma head 122(a) and the fluidization plane may be from about 0° to about 180°, or from about 10° to about 170°, or from about 20° to about 160°, or from about 30° to about 150°, or from about 40° to about 140°, or from about 50° to about 130°, or from about 60° to about 120°, or from about 70° to about 110°, or from about 80° to about 100°, or from about 85° to about 95°, or the like. In various embodiments, the angle between the line of propagation of the plasma head 122(a) and the fluidization plane may be controlled to control the residence time of various particles (e.g., input material particles) within the plasma and/or the reaction zone, which may in turn control the product obtained (including product selectivity, properties of the product). For example, when the angle between the fluidization plane and the gravity vector is about 0° and an angle between the fluidization plane and the plasma plane is about 90°, the residence of input reactants (i.e., catalyst and methane feedstock) in the reaction zone was determined to be about 2-3 seconds, and the product selectivity (on carbon basis) of the conversion reaction was determined to be about 78% acetylene, 17% solid carbon, and 5% ethylene. The residence time and product selectivity can be selectively configured for the same reactants by increasing or decreasing the angle between the fluidization plane and the plasma plane. For example, decreasing the angle may increase the residence time and hence the percentage of solid carbon. Specifically, since the aspect ratio of the plasma is higher along its axial direction, decreasing the angle between the fluidization and plasma plane may increase residence time of the particulates in the plasma. A higher residence times may then drive the methane pyrolysis reaction to completion, enabling more and more breakdown of acetylene to solid carbon, thereby changing the product selectivity towards solid carbon.

In some embodiments, the reaction materials are introduced generally upward. In some other embodiments, the reaction materials are introduced generally downward (where downward introduction may decrease the residence time of reactant particles in the reaction zone, and in the above example may yield a higher percentage of acetylene compared to solid carbon).

The diameter of the interface element 110 may be about 1 inch to about 5 inches, about 2 inches to about 4 inches, about 4 inches, about 1.5 inches, about 5 inches, or the like, for a system operating an electromagnetic radiation frequency of about 2.45 GHz. Accordingly, the length may be adjusted depending on the operation radiation frequency without deviating from the principles of this disclosure. The length "1" of the interface element 110 from a plane corresponding to the entry of the plasma 122 into the interface element 110 (e.g., from an outlet of the discharge tube) may be configured such that the plasma head extends at least partially into the reaction zone 104. Additionally and/or alternatively, the length "1" of the interface element 110 may be optimized such that a desired amount of plasma is propagated into to reaction zone in order to, for example, prevent overheating the walls of the reaction chamber that includes the reaction zone, reach a desired temperature within the reaction zone, allow for adequate thermal management of the plasma zone and the interface element, provide adequate plasma stability, optimize microwave or other energy coupling to the plasma, prevent premature decomposition of the plasma constituents, reach desired timing, kinetics, and location of the desired reactions, or the like. For example, the length "1" may be about 4 inches to about 13 inches, about 5 inches to about 12 inches, about 6 inches to about 11 inches, about 7 inches to about 10 inches, about 8 inches to about 9 inches, about 5 inches to about 6 inches, about 8 inches, about 12 inches, or the like. Optionally, the length of the interface element may be chosen to maximize energy delivery to the plasma by, for example, choosing a length that is a multiple of the electromagnetic wave's wavelength. Specifically, the interface element can have any length such that it terminates at a maxima position of the characteristic radiation frequency used in the system. Example, for a system operating at microwave radiation frequency of 2.45 GHz, the length can be about 4.9 inches, about 7.4 inches, or the like. Optionally, a length of the interface element may be determined using $[(n+1)*\lambda]/4$, where n=0, 1, 2, 3, etc. . . . and $\lambda$ is the wavelength of the electromagnetic radiation (e.g., about 36 MHz to about 300 GHz. There may be practical limits (lower and/or upper) on the length due to mechanical strain on the interface element, energy attenuation along the interface element length, etc. For example, the length of the interface element may be determined for different frequencies and "n" values as shown in Table 1 below:

TABLE 1

Range of interface element lengths for different multiples of wavelength, n (in)

| Frequency (Hz) | Wavelength (in) | n = 0 | n = 1 | n = 2 | n = 3 | n = 4 |
|---|---|---|---|---|---|---|
| 3.78-3.42E7 | 312.5-345.4 | 78.1-86.3 | 156.2-172.7 | 234.3-259 | 312.5-345.4 | 390.6-431.7 |
| 4.20-3.80E7 | 281.2-310.8 | 70.3-77.7 | 140.6-155.4 | 210.9-233.1 | 281.2-310.8 | 351.5-388.5 |
| 4.20-3.80E8 | 28.1-31.1 | 7-7.8 | 14.1-15.5 | 21.1-23.3 | 28.1-31.1 | 35.2-38.9 |
| 9.41-8.51E8 | 12.6-13.9 | 3.1-3.5 | 6.3-6.9 | 9.4-10.4 | 12.6-13.9 | 15.7-17.3 |
| 9.61-8.69E8 | 12.3-13.6 | 3.1-3.4 | 6.1-6.8 | 9.2-10.2 | 12.3-13.6 | 15.4-17 |
| 2.57-2.33E9 | 4.6-5.1 | 1.1-1.3 | 2.3-2.5 | 3.4-3.8 | 4.6-5.1 | 5.7-6.3 |
| 3.15-2.85E9 | 3.7-4.1 | 0.9-1 | 1.9-2.1 | 2.8-3.1 | 3.7-4.1 | 4.7-5.2 |
| 3.15-2.85E11 | 0.037-0.041 | 0.009-0.01 | 0.019-0.021 | 0.028-0.031 | 0.037-0.041 | 0.047-0.052 |

| Frequency (Hz) | n = 5 | n = 6 | n = 7 | n = 8 | n = 9 |
|---|---|---|---|---|---|
| 3.78-3.42E7 | 468.7-518 | 546.8-604.4 | 624.9-690.7 | 703-777 | 781.2-863.4 |
| 4.20-3.80E7 | 421.8-466.2 | 492.1-543.9 | 562.4-621.6 | 632.7-699.3 | 703-777 |
| 4.20-3.80E8 | 42.2-46.6 | 49.2-54.4 | 56.2-62.2 | 63.3-69.9 | 70.3-77.7 |
| 9.41-8.51E8 | 18.8-20.8 | 22-24.3 | 25.1-27.8 | 28.2-31.2 | 31.4-34.7 |
| 9.61-8.69E8 | 18.4-20.4 | 21.5-23.8 | 24.6-27.2 | 27.7-30.6 | 30.7-34 |
| 2.57-2.33E9 | 6.9-7.6 | 8-8.9 | 9.2-10.1 | 10.3-11.4 | 11.5-12.7 |
| 3.15-2.85E9 | 5.6-6.2 | 6.6-7.3 | 7.5-8.3 | 8.4-9.3 | 9.4-10.4 |
| 3.15-2.85E11 | 0.056-0.062 | 0.066-0.073 | 0.075-0.083 | 0.084-0.093 | 0.094-0.104 |

The length of the interface element 110 may further be configured to configure the length of the plasma head 122(a) with respect to the plasma 122.

The plasma 122 transmitted into within the interface element 121 (or formed within the interface element/reaction zone) is a non-equilibrium plasma and so does not have a well-defined temperature. Species comprising the plasma such as free electrons and various atoms, molecules, radicals or ions may have different temperatures. For example, in hydrocarbon plasmas, individual species may include electrons, methane ($CH_4$) molecules and radicals, methyl ($CH_3$) radicals and ions, atomic and molecular hydrogen and ions, $C_2$ molecules, radicals and ions, $C_3$ molecules, radicals, and ions, and heavier carbon particles. Each of the individual species may have a temperature of about 300 to about 4,000° C. Specifically, the temperature of a constituent species is about 400 to about 1,500° C., about 500 to about 1200° C., about 600 to about 1000° C., about 800 to about 1200° C., about 1000 to about 2000° C., about 1500 to about 4000° C. or about 300 to about 500° C. The electron density and/or the gas temperature of the plasma may be increased by increasing gas pressure, reducing the plasma forming gas flow rate in the discharge tube, reducing gas flow rates, decreasing discharge tube diameter, increasing the incident microwave power absorbed by the plasma and/or plasma-forming material, adjusting composition of the plasma-forming materials, and the like. The plasma head 122(a) may differ from the plasma 122 at the interface between the discharge tube 121 and the interface element 110 in one or more properties such as, without limitation, temperature, particle density, or the like. Optionally, the plasma head 122(a) may not be present and the plasma may be uniform, non-uniform, and/or uniformly changing through the length of the interface element. The pressure in the interface element 121 may be about 0.5-2.5 atmosphere, about 0.8-2.2 atmosphere, or about 1-2 atmosphere. However, the disclosure is not so limiting and other pressure ranges are within the scope of this disclosure. For example, in some applications such as thin film deposition and semi-conductor processing system pressure could be significantly lower than 1 atm such as $1 \times 10^{-4}$ atmospheres or lower. In other embodiments, the pressure could be higher than 2 atmosphere (e.g., about 2-8 atmosphere).

Figure 2A:
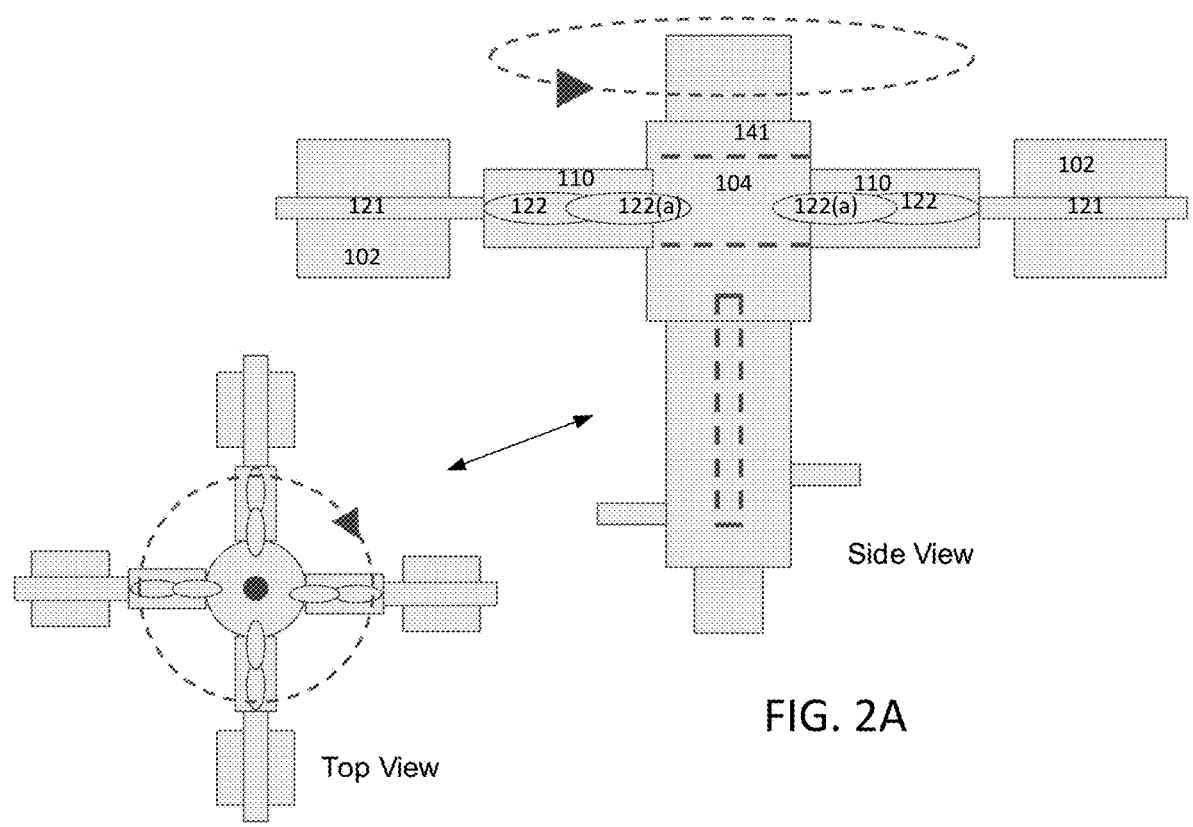
FIGS. 2A-2B illustrate alternate examples of a system including a fluidized bed.
Figure 2B:
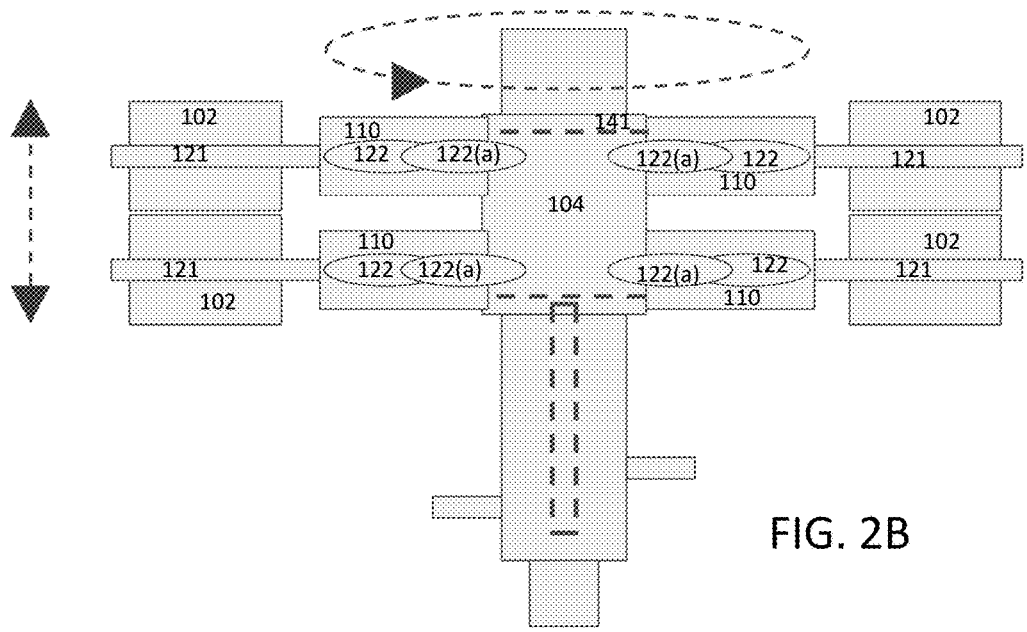
Figure 3:
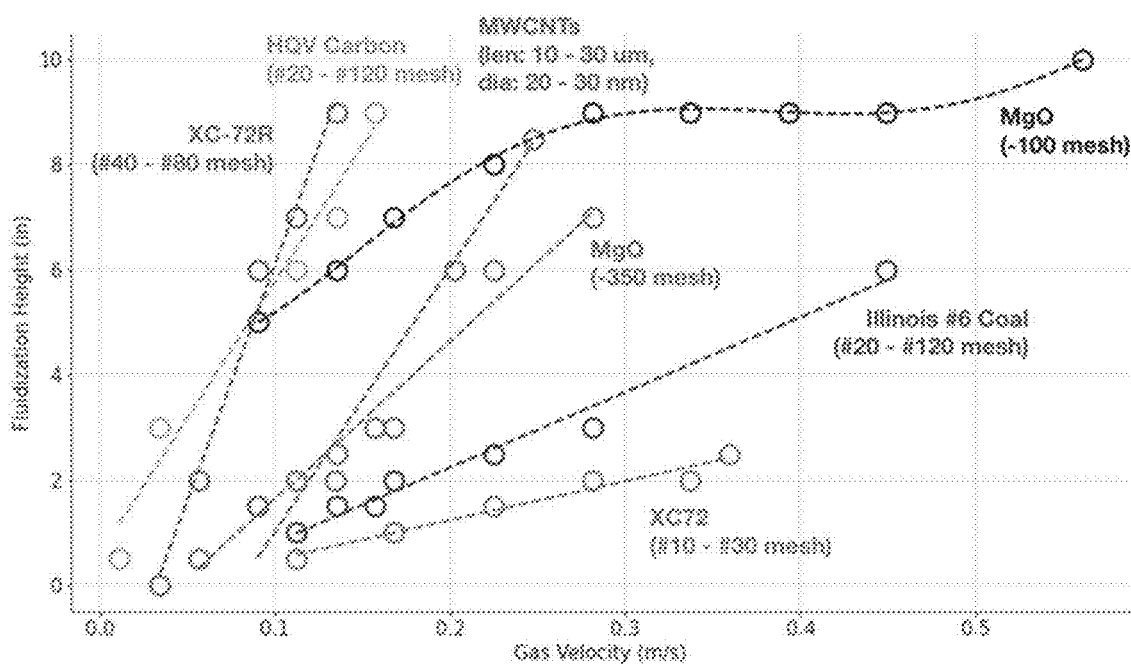
FIG. 3 illustrates an example relationship between fluidization height and properties of individual materials (with the starting bed height of 4 inches).

It should be noted that while the current disclosure describes a single plasma head being introduced into the reaction zone, it is not so limiting, and other configurations are within the scope of this disclosure. For example, a plurality of interface elements may be coupled to the reaction zone to introduce a plurality of plasma heads into the reaction zone. In such embodiments, the plurality of interface elements may be radially disposed around the reaction vessel (shown in FIG. 2A) in one or more concentric annular rings and/or stacked at different linear or non-linear positions along the length of the reaction zone (shown in FIG. 2B) and/or coupled to the reaction zone at any other suitable positions. In some example embodiments, each of the plurality of interface elements may be coupled to an individual microwave generator (as shown in FIGS. 2A and 2B). Optionally, two or more interface elements may be coupled to a single microwave generator (not shown here). In some embodiments, a single interface element may be coupled to a plurality of microwave generators (not shown here). Different and/or the same types of plasma may be transmitted in the reaction zone by different ones of the plurality of interface elements.

Referring back to FIG. 1, the reaction zone 104 may be formed inside a reaction vessel or tube 141. The reaction zone 104 is configured to facilitate interaction of and/or mixing of various reaction material(s) in the presence of the plasma head 122(*a*).

The reaction vessel boundary may be comprised of any now or hereafter known material capable of withstanding the heat, pressure(s), and chemical environments associated with processing of reaction material in the presence of microwave plasma. For example, the material of vessel boundary may be a microwave radiation opaque material (e.g., limits penetration of microwave radiation through the material). The microwave radiation opaque material may be, but is not limited to ceramics, carbon-based materials and composites, and metals or metal alloys, such as brass, copper, steel, nickel, stainless steel, titanium, and aluminum, and alloys and combinations thereof. In one embodiment, the vessel is operated at atmospheric pressure. Accordingly, the vessel is configured to withstand the heat, pressure(s), and chemical environment(s) associated with processing the reaction material.

Geometry parameters (e.g. length and diameter) of the reaction vessel 141 are determined by entrainment and fluidization properties of the reaction materials (and/or product(s) formed), and are determined to target optimal residence time of the reaction materials (within various parts of the reaction vessel such as the reaction zone) and space velocity of the process, carrier, and other gases. For example, for a cylindrical reaction vessel the length to diameter ratio could be from about 1:1 to 1:2, from about 1:2 to about 1:5, from about 1:10 to about 1:20. The length of the reaction vessel could be determined as a function of total gas velocity and the desired residence time. The reaction vessel can be shaped to increase or slow the velocity of the gas flow. For example, reducing the diameter of the reaction vessel may increase the gas flow velocity and reduce the residence time of reaction particles at the point(s) of reduced diameter. The reaction vessel can be less than 6 inches long, or between about 6 and about 12 inches long, or between about 12 and about 24 inches long, or between about 24 and 36 inches long, or between about 2 feet and 4 feet long, or between about 3 feet and 6 feet long, or greater than 5 feet long. In some embodiments, geometry of the reaction vessel 141 can be strictly cylindrical. In some embodiments, geometry of the reaction vessel 141 can be conical. In some embodiments, geometry of the reaction vessel can be radially symmetrical. In some embodiments, geometry of the reaction vessel can be defined by a Bezier curve. In some embodiments, geometry of the reaction vessel is that of a converging-diverging nozzle.

A particle fluidization assembly 142 may be coupled to the reaction chamber 141 and/or included within a bottom portion of the reaction chamber 141, where the fluidization assembly 142 may fluidize reaction materials until they reach a plasma plane (i.e., the location where the plasma is received into the reaction zone and/or generated within the reaction zone). As such, the reaction vessel 141 may receive, within the reaction zone 104, reaction materials (gases, droplets, and/or solids—generally referred to as "particles") from the fluidization assembly and the plasma head 122(*a*) of the non-thermal plasma 122 from the interface element 110. The size and/or location of the reaction zone 104 may be dynamic, and may be configured to receive an optimal flow of the fluidized reaction materials and the plasma head in a direction that is approximately perpendicular to the fluidized bed of reaction materials. Optionally, in some embodiments, the fluidization assembly may not be directly located below the reaction vessel but positioned with respect to the reaction chamber (or reaction zone) such that it spouts reaction particles at a desired angle with respect to plasma plane. In some embodiments, the location of the fluidization assembly with respect to reaction zone may be configurable by, for example, coupling the fluidization assembly with the reaction zone in a rotatable manner such that the fluidization assembly can be moved to a desired angle with respect to the reaction zone.

As used herein, the term "reactants" refer to one or more substances, compounds, materials, etc. that is converted to a product (e.g., solid carbon, carbon black, graphene, nanocarbons, composite materials, hydrogen, acetylene, ethylene, processed hydrocarbons, liquid fuel, polyaromatics, etc.) and/or an intermediate product is formed in the presence of plasma. Examples may include, without limitation, feedstock material (e.g., hydrocarbon feedstock), catalyst, gas entrained aerosol, carbon based solids (e.g., carbon nanofibers), or the like. The term "reaction materials" refer to any material introduced within the plasma (at a desired angle) including the reactants or any other materials that may not form the products or intermediate products such as, without limitation, process gas, fluidization gas, carrier gas, spouting gas, or the like. The reactants (e.g., feedstock and/or catalytic materials) may be in powder form (such as coal particles) that may be fluidized as described below using, for example, fluidization gas and/or spouting gas. In an embodiment, the feedstock material may include hydrogen and/or carbon containing gases, liquids, and other materials such as, without limitation, aromatic alkylated aromatic, paraffinic, olefinic, cycloolefin, naphthenic, alkane, alkene, alkyl cycloalkane, alkylated cycloalkane, alkyne, or heteroatom hydrocarbons; methane, ethane, propane, butane, acetylene, syngas, natural gas, hexane, benzene, paraffins, naphthalene, polyaromatics other hydrocarbon gases, hydrogen, carbon monoxide, carbon dioxide, water vapor, hydrogen sulfide, hydrogen cyanide, alcohols (ethanol, methanol, propanol, and others), phenolic, paraffinic, naphthenic, aromatic compounds, coal, carbon black, acetylene black, plasma black, activated carbon, carbon fiber, carbon nanomaterials, graphene, graphene oxide, graphene precursors, coal tar pitch, chemical oil, or other fractions, decant oil, petroleum fractions, green oil, ethylene or fluid catalytic cracking (FCC) oil, or combinations thereof. In an embodiment, the feedstock materials may also include various metal or rare earth oxides or other compounds (ores) to be reduced or otherwise processed in the plasma atmosphere. In an embodiment, these same metals can be oxidized, melted, atomized, or otherwise processed in the plasma atmosphere. Examples of such metals and rare earths include lithium, sodium, potassium, rubidium, cesium, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, tantalum, tungsten, rhenium, osmium, iridium, platinum, gold, mercury, actinium, cerium, praseodymium, neodymium, promethium, samarium, europium, gadolinium, terbium, dysprosium, holmium, erbium, thulium, ytterbium, aluminum, gallium, indium, tin, thallium, lead, bismuth, beryllium, magnesium, calcium, strontium, barium, radium, and others, and/or combinations thereof.

In various implementations, catalyst particles such as various metals, metal oxide salts or powders, carbon material, or other metallic materials or organometallic species which may enhance the reaction caused by the plasma. Examples of catalysts may include materials containing iron, nickel, cobalt, molybdenum, carbon, copper, silica, oxygen, copper, nickel, gallium, silver, palladium, platinum, magnesium, calcium, zeolites or other materials or combinations of any of these materials. Alternatively, no catalyst may be used. In one embodiment, the reaction materials may include an additive such as, but are not limited to, carbon black, coal, biochar, biomass, graphite, coke, structured carbon, carbon dioxide, carbon monoxide, and hydrogen, nitrogen, lithium, and/or boron. The additive may accelerate the conversion of the feedstock material to the product, facilitate selectivity of a specific product, or facilitate improvement of the product by chemical, structural or other means.

As shown in FIG. 1, the fluidization assembly 142 may include a fluidization chamber 150 for holding and/or fluidizing reaction materials (e.g., reactants) over a perforated support or distributor 152. The distributor 152 may be coupled to a fluidization gas supply inlet or port 153 such that a fluidization gas may be introduced in the fluidization chamber 150 via the perforations in the distributor 152. Alternatively and/or additionally, one or more fluidization gas inputs or ports may be included in other portions of the fluidization chamber 150 (e.g., ports 154a-n in the walls of the fluidization chamber for providing a tangential flow of a fluidization gas. Examples of the perforated distributor 152 may include, without limitation, a mesh (having a hole size configured to distributor or retain particles of desired reaction particle sizes and/or product size), a fritted disk base (a porous fritted disk made of quartz glass or other suitable materials of a desired mesh size for holding the material to be fluidized and to uniformly distribute the fluidization gas across the fluidization bed), porous materials (e.g., porous silica, foam), porous metals, open cell carbon structures (e.g., carbon foam), or the like.

In various implementations, the reaction materials may be added to the fluidization chamber 152 to form a particle bed (e.g., static bed) over the distributor 152, and a fluidization gas may be introduced by connecting the perforated distributor 152 (and/or other input ports) to a fluidization gas supply 153. Introduction of the fluidization gas may cause fluidization of the particle bed over the distributor 152 to create a fluidization bed. As used herein "fluidization" refers to a process wherein a granular material (e.g., feedstock materials, catalyst, etc.) is converted from a static solid-like state to a dynamic fluid-like state. This process occurs when a fluid (liquid or gas) is passed up through the granular material. When fluidized, a bed of solid particles will behave as a fluid, like a liquid or gas. When a gas flow is introduced through the bottom of the bed of solid reaction materials in the fluidization chamber, the granular feedstock particles will move upwards through the bed via the empty spaces between the particles. At low gas flow velocities, aerodynamic drag on each particle is also low, and thus the bed remains in a fixed state. As the gas flow velocity is increased, the aerodynamic drag forces will begin to counteract the gravitational forces, causing the bed to expand in volume as the particles move away from each other. Further increasing the gas velocity until it reaches a critical value (e.g., a threshold) at which the upward drag forces is equal the downward gravitational forces, the particles become suspended within the fluid (i.e., fluidization gas). At this critical value, the bed is said to be fluidized and will exhibit fluidic behavior.

Figure 4:
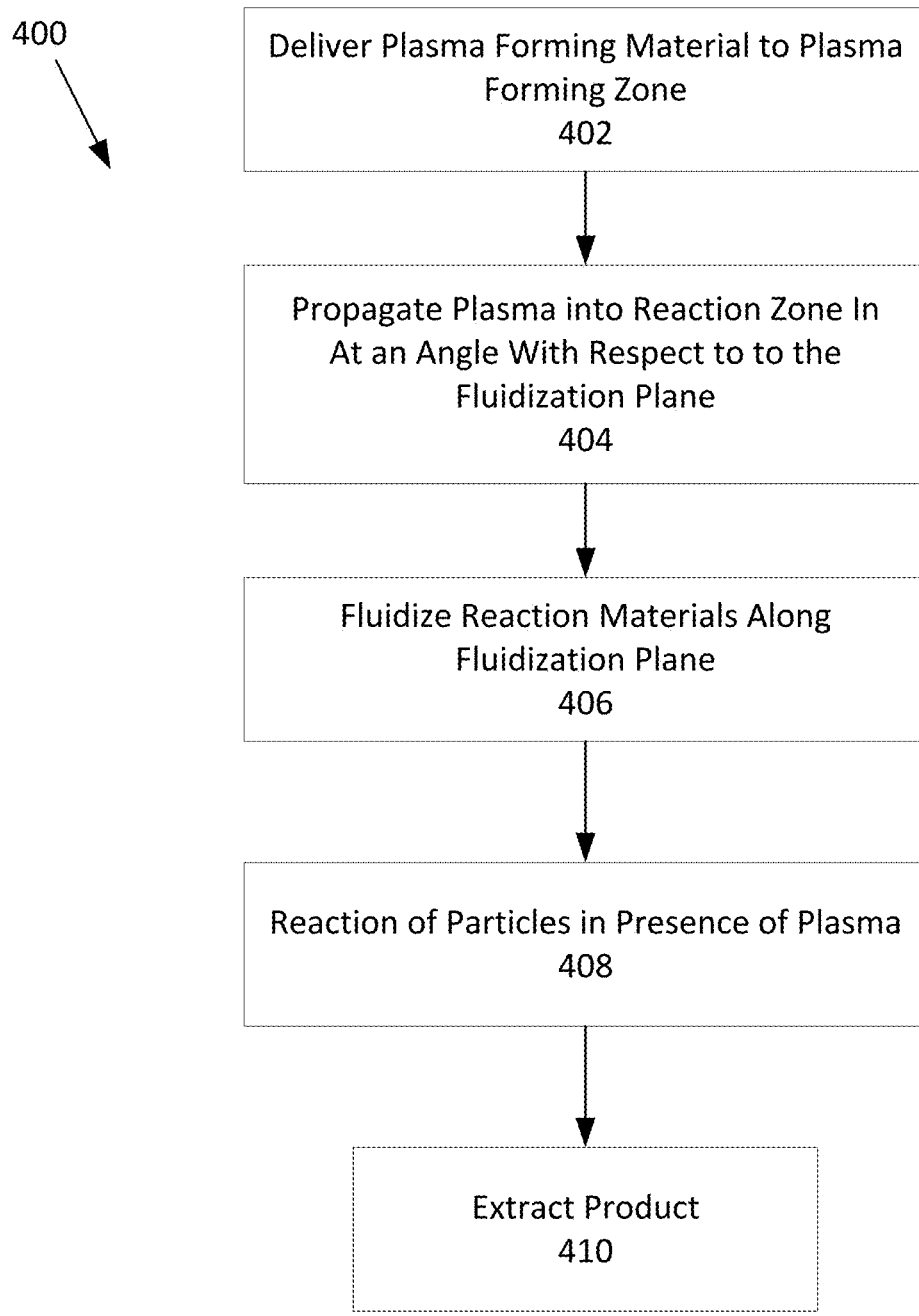
FIG. 4 depicts a flow chart illustrating an example method for processing the reaction materials into the product utilizing the plasma.

Any now or hereafter known fluidization gases may be introduced into the particle bed. Such fluidization gases may be inert gases chosen simply to assist in the fluidization (e.g., noble gases like Argon, nitrogen, etc.), and/or they may alternatively be reactive gases (e.g., carbon dioxide) that take part in the chemical reaction. The fluidization gas or gases should have a flow rate into the particle bed sufficient for it to be fluidized, without the production of large bubbles in the fluidized bed. As is known to those skilled in the art, the precise rate of flow sufficient to initiate fluidization with a given collection of particles may depend, for example, on the particle size distribution, density of the particles, initial bed height, density and mass of the entrainment or fluidization gas, and the desired fluidization height. The chart of FIG. 4 illustrates an example relationship between fluidization height and properties of individual materials (with the starting bed height of about 4 inches). For example, for an initial bed height of about 4 inches, to double the fluidization bed height, gas velocities could be less than 0.1 m/s, between about 0.1 and 0.2 m/s, between about 0.2 and 0.3 m/s, between about 0.3 and 0.4 m/s, and between about 0.4 and 0.5 m/s and greater than about 0.5 m/s. To increase the fluidization height, the velocity can be scaled up linearly depending on the particle properties. For example, to double the fluidization height, the velocity can be increased by a factor of about 0.1, or 0.25, or 0.5, or 1, or 2, or 4, or 10.

The initial bed height, height of the fluidization bed, and/or the distance between the fluidization assembly 142 and the reaction zone 104 may be configured such that upon fluidization, the reaction particles are introduced into (and/or cycled through for a desired number of times) the reaction zone 104 for initiation of reaction(s) in the presence of plasma received via the interface element 110. The height of the fluidization bed and/or the properties of the particles entering the reaction zone 104 (e.g., density, residence time, velocity, etc.) may be controlled by controlling, for example, the flow 21 elocity(ies) of the fluidization gas, location of input of the fluidization gas, the diameter of the perforations in the distributor 152, the dimensions (e.g., diameter) of the holding chamber 150, the initial mass of the reaction materials, the initial height of the particle bed particle size, particle bulk density, type of fluidization/spouting gas, or the like. These factors may be interrelated. For example, as the particle size reduces, the gas flow rate required to reach the same fluidization height reduces.

The holding chamber 150 may, optionally, include an annular spouting tube 155 (may or may not be co-axial) including a plurality of perforations or holes 155a-n. The perforations 155a-n are configured such that particles contained or suspended in the fluidized bed may fall into (and/or sucked into owing to the Venturi effect) the spouting tube through the holes 155a-n. The holes 155 a-n may be down-angled, tangential, normal, and/or up-angled with respect to the spouting tube. A spouting gas (which may be the same as the fluidization gas and/or a different gas) may be introduced into the spouting tube 155 such that particles falling into the spouting tube 155 may be spouted or ejected with a speed that carries them back into the reaction zone 104. The spouting tube may, for example, allow for recirculation of the particles between the fluidized bed and the reaction zone multiple times, allow for fluidization of larger particles, distribute the fluidization gas and/or the spouting gas evenly.

The location of the spouting end annular spouting tube 155 may be configured for optimal ejection of the reaction particles into the reaction zone 104. For example, the spouting end may extend beyond the fluidization assembly 142 into the reaction vessel 141. Various properties of the particles spouted into the reaction zone 104 (e.g., density, residence time, velocity, etc.) may be controlled based on, for example, spouting gas density, spouting gas velocity, feed rate of the spouting gas, the initial particle bed height, the fluidized bed height, location of the spouting end, particle size, particle bulk density, mesh size, type of distributor and perforation size, spouting gas and/or fluidization gas size, or the like. For example, particle spouting increases with increasing particle bed height, increasing the fluidization gas and/or spouting gas flow rate or velocity, fluidization height increases as the gas flow rate (velocity) increases, or the like. Furthermore, one or more of the above factors may be interrelated. For example, the gas flow rate required to reach the same fluidization height reduces as the particle size reduces, gas flow rate required for the particles to reach the same fluidization height reduces as the bed height increases, or the like.

The following Table 2 illustrates the achieved fluidization height for the materials tested as a function of fluidization gas flow (in standard liters per minute "SLPM") and the corresponding gas velocity. The fluidization gas is nitrogen, and the initial (packed) bed height is 4 inches.

TABLE 2

| Material | Mesh Size | Gas | Bed Height (in) | Gas Vol. Flow (SLPM) | Gas Velocity at base of bed (m/s) | Fluidization height from fritted disk (in) | Increase in height (in) |
|---|---|---|---|---|---|---|---|
| Carbon Nanotubes | 10-30 × 0.02 um | $N_2$ | 4.0 | 0.50 | 0.006 | 5.00 | 1.00 |
| | | | | 1 | 0.011 | 5.00 | 1.00 |
| | | | | 2 | 0.022 | 5.00 | 1.00 |
| | | | | 4 | 0.045 | 5.00 | 1.00 |
| | | | | 6 | 0.067 | 5.00 | 1.00 |
| | | | | 8 | 0.090 | 5.50 | 1.50 |
| | | | | 12 | 0.135 | 6.00 | 2.00 |
| | | | | 14 | 0.157 | 7.00 | 3.00 |
| | | | | 18 | 0.202 | 10.00 | 6.00 |
| | | | | 20 | 0.225 | 12.00 | 8.00 |
| | | | | 22 | 0.247 | 12.50 | 8.50 |
| XC-72 | −10 to +30 mesh | $N_2$ | 4.0 | 1 | 0.011 | 4.00 | 0.00 |
| | | | | 3 | 0.034 | 4.00 | 0.00 |
| | | | | 5 | 0.056 | 4.00 | 0.00 |
| | | | | 10 | 0.112 | 4.50 | 0.50 |
| | | | | 15 | 0.168 | 5.00 | 1.00 |
| | | | | 20 | 0.225 | 5.50 | 1.50 |
| | | | | 25 | 0.281 | 6.00 | 2.00 |
| | | | | 30 | 0.337 | 6.00 | 2.00 |
| | | | | 32 | 0.359 | 6.50 | 2.50 |
| HQV Carbons | −120 to +200 mesh | $N_2$ | 4.0 | 1 | 0.011 | 4.50 | 0.50 |
| | | | | 3 | 0.034 | 7.00 | 3.00 |
| | | | | 8 | 0.090 | 10.00 | 6.00 |
| | | | | 10 | 0.112 | 10.00 | 6.00 |
| | | | | 12 | 0.135 | 11.00 | 7.00 |
| | | | | 14 | 0.157 | 13.00 | 9.00 |
| XC-72R | −40 to +80 mesh | $N_2$ | 4.0 | 1 | 0.011 | 4.00 | 0.00 |
| | | | | 3 | 0.034 | 4.00 | 0.00 |
| | | | | 5 | 0.056 | 6.00 | 2.00 |
| | | | | 8 | 0.090 | 10.00 | 6.00 |
| | | | | 10 | 0.112 | 11.00 | 7.00 |
| | | | | 12 | 0.135 | 13.00 | 9.00 |
| Illinois 6 coal | −20 to +120 mesh | $N_2$ | 4.0 | 1 | 0.011 | 4.00 | 0.00 |
| | | | | 3 | 0.034 | 4.00 | 0.00 |
| | | | | 5 | 0.056 | 4.25 | 0.25 |
| | | | | 8 | 0.090 | 4.50 | 0.50 |
| | | | | 10 | 0.112 | 5.00 | 1.00 |
| | | | | 12 | 0.135 | 5.50 | 1.50 |
| | | | | 14 | 0.157 | 5.50 | 1.50 |
| | | | | 15 | 0.168 | 6.00 | 2.00 |

TABLE 2-continued

| Material | Mesh Size | Gas | Bed Height (in) | Gas Vol. Flow (SLPM) | Gas Velocity at base of bed (m/s) | Fluidization height from fritted disk (in) | Increase in height (in) |
|---|---|---|---|---|---|---|---|
| | | | | 20 | 0.225 | 6.50 | 2.50 |
| | | | | 25 | 0.281 | 7.00 | 3.00 |
| | | | | 40 | 0.449 | 10.00 | 6.00 |
| Magnesium Oxide | −100 mesh | $N_2$ | 4.5 | 1 | 0.011 | 5.00 | 0.50 |
| | | | | 2 | 0.022 | 5.00 | 0.50 |
| | | | | 3 | 0.034 | 5.00 | 0.50 |
| | | | | 4 | 0.045 | 5.00 | 0.50 |
| | | | | 5 | 0.056 | 5.00 | 0.50 |
| | | | | 8 | 0.090 | 5.00 | 0.50 |
| | | | | 12 | 0.135 | 6.00 | 1.50 |
| | | | | 15 | 0.168 | 7.00 | 2.50 |
| | | | | 20 | 0.225 | 8.00 | 3.50 |
| | | | | 25 | 0.281 | 9.00 | 4.50 |
| | | | | 30 | 0.337 | 9.00 | 4.50 |
| | | | | 35 | 0.393 | 9.00 | 4.50 |
| | | | | 40 | 0.449 | 9.00 | 4.50 |
| | | | | 50 | 0.561 | 10.00 | 5.50 |

It should be noted that with or without the use of the spouting tube for entraining or fluidizing the particles, the fluidization may be controlled such that particles may be recirculated between the fluidized bed and the reaction zone (i.e., the plasma plane) multiple times. In some embodiments, a spouting tube may not be present. For example, a gas distributor may be used as an alternate to a spouting tube.

In some other embodiments, multiple spouting tubes may be provided. In such embodiments, each of the multiple spouting tubes may have the same spouting gas and/or at least some of the spouting tubes have different spouting gases. Additionally and/or alternatively, each of the multiple spouting tubes may have a spouting gas provided at the same gas flow velocity and/or at least some of the spouting tubes have a spouting gas at different gas flow velocity. For example, a first spouting tube may cause spouting of the catalyst particles using a first spouting gas at a first gas flow velocity, and a second spouting tube may cause spouting of the hydrocarbon feedstock particle using a second spouting gas at a second gas flow velocity. Such a configuration may allow for control of the reaction times to, for example, control the interaction between the catalyst particles and the feedstock particles. In some embodiments, similar and/or different particles spouted from different tubes may be separated and/or processed in different regions of the reaction zone and/or evacuated from the reaction zone by exploiting gas temperature and velocity, differences in particle mass and density, and/or changes in these properties as the particles pass through the reaction zone. For example, in an embodiment of a methane pyrolysis process, particles (e.g., heat transfer particles) comprising metals with a low boiling point (e.g. zinc, cesium, gallium, indium, and others) may be spouted first in a part of the reaction zone with a higher temperature to cause them to evaporate, and subsequently recondense in a lower-temperature part of the reaction zone. Such recondensed particles may provide surface area for condensation of pyrolysis products (e.g., polyaromatic molecules) before they can fully carbonize (where timing and/or location of the formation of the pyrolysis products may controlled using spouting time and/or location). These liquid pyrolysis products may then further be separated from the metal particles by heating the mixture to a moderate temperature (e.g. 400° C.) above the melting point of the metal to cause the two liquids to phase-separate, where the metal can once again be atomized into particles and recycled back into the process.

Examples of the process gas, the fluidization gas and/or the spouting gas may include, for example, hydrogen, nitrogen, methane, carbon monoxide, carbon dioxide, water vapor, hydrocarbon gases ($C_nH_{2n+2}$, $C_nH_n$, $C_nH_n$, where n=2 through 6) inert gas such as argon, helium, krypton, neon or xenon, or other compounds of hydrogen and carbon. Multiple gas sources may be available so that a combination of process gas, the fluidization gas and/or the spouting gas is directed into the fluidization chamber and/or the reaction zone.

The reaction vessel 141 may also include an exhaust assembly 143 coupled to and/or included within an upper portion of the reaction chamber 141. It will be understood that the location of the exhaust assembly may be suitable configured depending, for example, on the angle between the plasma plane and the fluidization plane. The exhaust assembly 143 may be configured to eliminate product entrainment within the exhaust from the reaction zone 104. The exhaust assembly 143 may include a conduit coupled to and/or included in the reaction chamber 141 above the reaction zone 104. In some embodiments, product from the reaction zone may be entrained within an exhaust gas output from the reaction zone, where decreasing the velocity of the exhaust gas restricts and/or eliminates product entrainment. The velocity may be controlled for restricting and/or eliminating product entrainment by, for example, controlling the height and/or the diameter of the conduit (e.g., velocity decreases as the height and/or the diameter increases), location of the spouting end of the spouting tube with respect to the reaction zone (e.g., velocity decreases as the distance between the reaction zone and the spouting end increases), diameter of the spouting tube (e.g., velocity decreases as the diameter of the spouting tube increases), controlling the temperature (e.g., velocity decreases as the temperature of the exhaust assembly decreases), or the like. Control of the exhaust gas velocity may also vary depending on the reactor design and location of the fluidization plane with respect to the plasma plane. In various implementations, the temperature within the conduit may be about 400° C. to about 800° C., and the pressure may be about 1-2 atm. In an embodiment, the exhaust assembly 143 may also be coupled to a cooling assembly (not shown here) for controlling the temperature of the exhaust gas. The exhaust gas may, optionally, be collected at an output port (not shown here). The products can be gases, vapors, liquid droplets, condensed droplets, condensed solids, and/or nascent or modified bed particles. Products may be entrained in the exhaust gas, may be entrained in the fluidized bed, and/or may be retained in the reaction zone (e.g., as solid particles adhered to the reaction zone walls). As such, product extraction methods may vary and may be selected based on, for example, the product location, product type, desired conversion rate, or the like. For example, products may be collected as they are entrained in the exhaust gas and are carried outside the reactor vessel by increasing the exhaust gas velocity. Solid particles can be collected using known solid capture methods such as properly sized cyclones, electrostatic precipitators, traps, and baghouses (e.g., coupled to the reaction zone and/or the fluidized bed). Gases and vapors can separated and collected using standard methods, including but not limited to bubbling bath, impingement, adsorption, absorption, cryogenic and stand distillation methods. Entrainment of >50%, >60%, >75%, >90%, or virtually all of products and bed particles can be achieved by sufficiently increasing velocity of the entrainment gas. For example, it may be sufficient to increase gas velocity by less than a factor of 2×, or between 2× and 3×, or between 3× and 5×, or between 4× and 8×, or between 5× and 10×, or more than 10× to entrain bed particles and remove them from the reaction vessel.

The fluidized bed system of this disclosure may be useful in accelerating any now or hereafter known reactions already known to be assisted by the formation of reactive species in a plasma. Reactions in the presence of plasma may, for example, occur between gases. They may alternatively occur between one or more gases and the surface of the particles, as for example when the reaction results in the deposition of a layer upon the surface of the particles or in the etching away of a portion of the surface of the particles. The reactions may alternatively occur between one or more particles which have passed through the plasma and then impinge upon a surface, or upon a liquid, or upon a solid work piece of some shape. These include situations in which intermediates are formed from reaction particles in the presence of plasma or otherwise, and these intermediates go on to react further. The formation of such reactive intermediates is a common occurrence in reactions involving reaction particles in the presence of plasma. The intermediates may be ions, radicals, adsorbates, absorbates, or other types of intermediates. The formation of these species may be enhanced and/or otherwise controlled by using the fluidized bed systems and methods discussed above. In various embodiments, various system configurations discussed above may be controlled to control the residence time and/or the density of the particles in the plasma leading to optimization of conversion rate, energy efficiency, catalyst durability, product type, and/or other performance metrics of the reaction.

In an embodiment, the plasma received in the reaction zone 104 initiates selective conversion of the reaction material to a product comprising carbon nanomaterials, including but not limited to carbon blacks, activated carbon, carbon fibers, graphene, graphene oxide, fullerene, or others. Products may also include hydrogen and/or chemicals such as ammonia. For example, the feedstock material receives energy from collision(s) with the ions and electrons within the plasma comprised of plasma-forming material to selectively dissociate the feedstock material. The dissociated species are quenched and preferentially rejoin to form products. In one embodiment, the product comprises a carbon-enriched material and a hydrogen-enriched material. The carbon-enriched material has a hydrogen atom to carbon atom ratio of less than or equal to one. For example, the carbon-enriched material may include, but is not limited to, carbon nanomaterials, a graphitic material, amorphous carbon, structured carbon, and ordered carbon. The carbon-enriched material may include graphene of varying lateral dimension and atomic layers, amorphous and carbon blacks, and/or graphite. Carbon-enriched materials may include acetylene, benzene, and polyaromatic materials such as naphthalene, anthracene, phenanthrene, and others. The hydrogen enriched material may include, but is not limited to, hydrogen, methane, ethane, propane, ethylene, acetylene, butadiene, butane, and combinations thereof. In one embodiment, the conversion percentage of the feedstock material to the product on a molar basis may be, but is not limited to, 95%-99%, or 80%-95%, or 50%-80%, or greater than 75%, or greater than 5%, or less than 10%, or between 25% and 50%, or between 25 and 50%. Yields of a particular material may be about, but not limited to, less than 1%, less than 5%, less than 10%, between 5% and 25%, between 15% and 45%, between 25% and 50%, between 45% and 60%, between 50% and 75%, between 60% and 90%, between 75%, and 95%, greater than 80%, greater than 90%, greater than 95%, or greater than 99%, on a hydrogen, carbon, oxygen, nitrogen, or a chosen reaction material basis. Accordingly, the feedstock material is selectively converted to the product within reaction zone 104.

It should be noted that while the current disclosure describes fluidization of reaction materials within the plasma, the disclosure is not so limiting. For example, dispersion may be used without fluidization via a disrupted static bed in which gas flow through the bed induces particle motion in the bed to enable reactant particle mixing and homogenous processing without approaching the fluidization state.

Referring to FIG. 4, a flow chart 400 is provided illustrating an example method for processing fluidized reactants into a product using the system of FIG. 1. While the processing method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, or the steps may be performed in the order disclosed or in an alternate order.

At 402, a plasma forming material may be delivered (e.g., provided) to an energy coupling zone and exposed to microwave radiation. The exposure of the plasma forming material to the microwave radiation may selectively convert the plasma forming material to a plasma which is propagated (404) into a reaction zone via an interface element at a desired angle with respect to a fluidized plane (e.g., a direction that is perpendicular to a fluidization plane).

At 406, reactants may be provided and fluidized in a fluidization assembly along the fluidization plane. As discussed above, the fluidization may be performed using a fluidization gas (with or without a spouting tube). Upon fluidization, particles (i.e., the reactant particles) may be circulated through the plasma in the reaction zone (one or more times).

The reaction materials may interact with the plasma (408). During the interaction, for example, reactant particles (such as the feedstock material) are exposed to the plasma for selectively converting the feedstock material to a product (e.g., a product comprising carbon nanotubes). The product may be extracted from the reaction zone (410).

Figure 5:
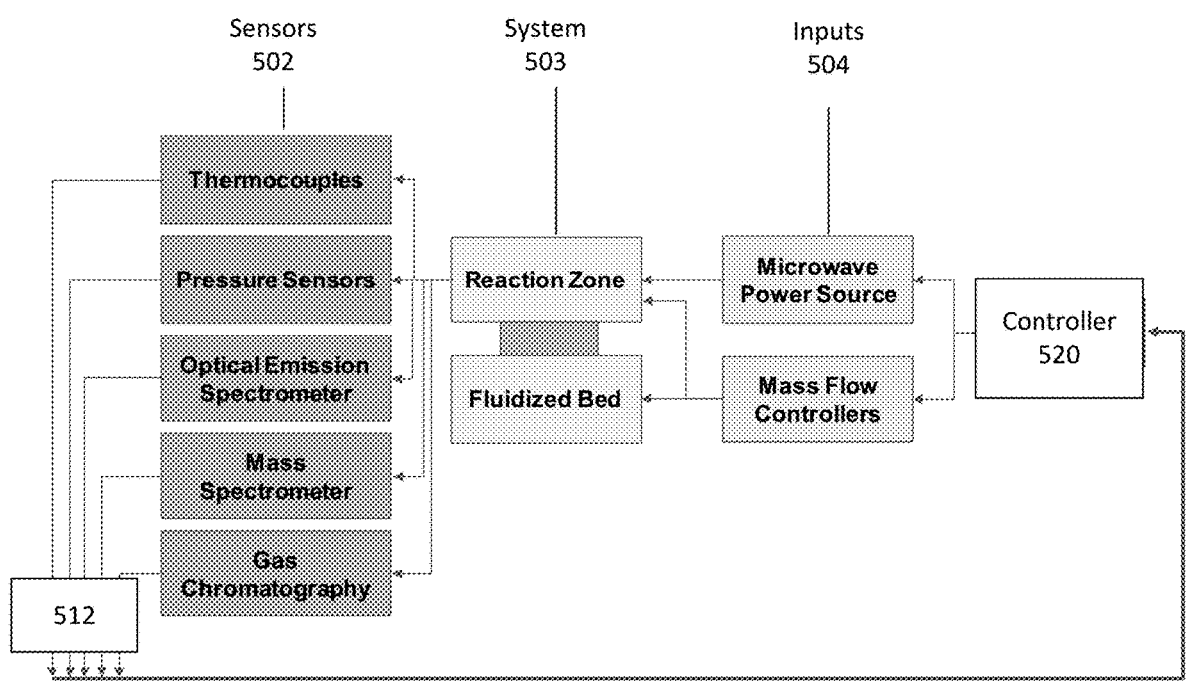
FIG. 5 illustrates a closed loop control architecture for controlling the operations of the system of FIG. 1.

While not shown here, the system of FIG. 1 may include (by instrumentation) and/or be associated or coupled with one or more sensors for monitoring and/or measuring one or more conditions (e.g., temperature, pressure, fluidized bed height, particle density, humidity, microwave radiation characteristics, plasma characteristics, reactant/product characteristics, emission spectra, effluent composition, residence time, etc.) within the system components. The sensor data may be used by a controller that is in electric communication with the sensors and/or one or more components of the system of FIG. 1 to control the above conditions in a feedback control or closed loop manner to achieve desired outputs, reaction conditions, process variables, and/or desired products as shown in FIG. 5. Specifically, as shown in FIG. 5, sensor data 512 may be collected by the sensors 502 (e.g., temperature sensors, pressure sensors, optical emission spectrometer, mass spectrometer, gas chromatograph, etc.) from the system 503 (including the reaction zone and the fluidized bed). The collected sensors data 512 may be analyzed by the controller 520 for determining control instructions for automatically adjusting various process variables of the system, via, for example, adjustment of mass and energy inputs. Examples of the process variables can include, without limitation, feedstock conversion rate, product type or composition, energy requirements, product selectivity, gas and solid temperature, plasma characteristics, etc. In particular, the controller is configured for capturing data generated by the sensors and using the sensor data in combination with a model (or table) of responsivities to various levels of the process variables on the desired output (e.g., reaction conditions, product composition or selectivity, etc.) to determine control instructions for varying the system inputs in order to achieve the desired output. For example, a process control module (PCM) including a process model of the fluidization process may be communicably coupled to the controller. The PCM is configured to receive the sensor data as an input to the process model, and to generate at least one output configured to affect operation of the system. For example, the disclosed closed loop process controller maintains reaction zone and plasma temperature at a preselected value resulting in improved reaction efficiency and product selectivity for formation of solid materials such as, but not limited to, carbon materials (amorphous/crystalline carbon black, graphene, nanotubes, etc.), metallic powders (e.g., pure form or alloys of copper, tungsten, aluminum, etc.), chemicals such as, but not limited to, hydrogen, hydrocarbons (acetylene, ethylene, methane, ethane, propane, and other alkanes and olefins, aromatics and cycloalkenes, such benzene, toluene, xylenes, and polyaromatics such as naphthalene, anthracene, phenanthrene, etc.), industrially used gasses (ammonia, carbon monoxide, carbon dioxide, hydrogen, etc.), or the like.

Therefore, the present disclosure provides the capability to (1) automate the fluidize bed reaction process via computer control/logging of all measurable parameters; (2) implement in situ sensors so as to measure various conditions or properties in real time; and (3) implement close-loop process control based on the sensor data, to produce improved reaction conditions (e.g., conversion efficiency, product quality control, energy optimization, etc.). The consistency and repeatability of fluidized bed reactions, made possible by the in situ control of reaction conditions or process variables, makes the fluidized bed process of the current disclosure a more viable option for industrial applications. The present disclosure also advances the state of the art in fluidized bed reactions by making it repeatable, consistent and cost effective. As a practical matter, the present disclosure minimizes operator error, provides a record of any deviations in reactions, and integrates all automation components.

Optionally, the controller may provide instructions to a user for manually adjusting the process variables.

Figure 6A:
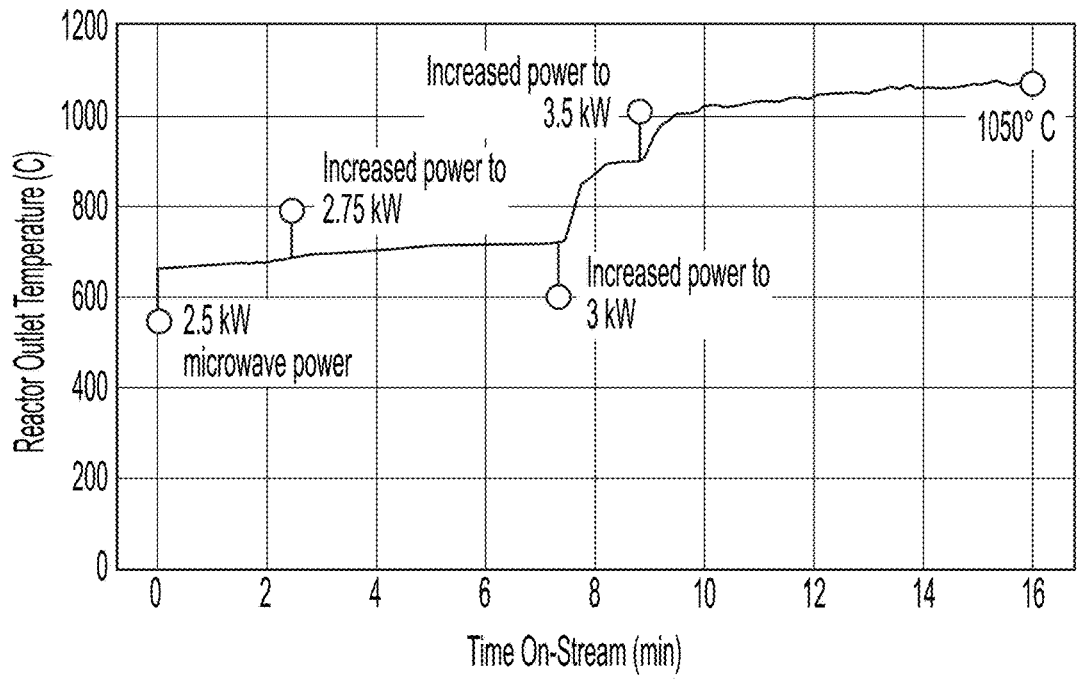
FIG. 6A illustrates an example relationship of temperature with microwave power input.
Figure 6B:
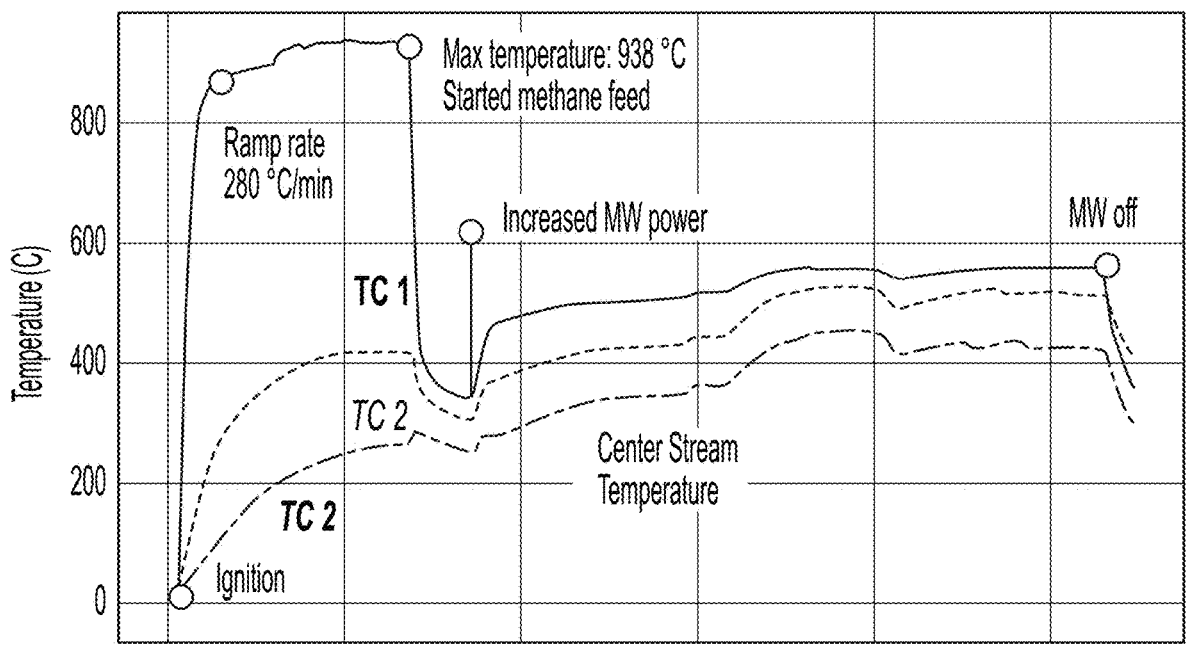
FIG. 6B illustrates an example relationship of temperature with coupling of microwave energy to process gas.

For example, temperature may determine and/or control the thermodynamic stability of different chemical species and the kinetics of chemical reactions taking place within the reaction zone. Specifically, different thermal profiles within the reactor result in different product compositions. In addition to process control, temperature measurement and control may be used to ensure that reaction materials are operating within their recommended working temperature. As such, temperature sensors (e.g., thermocouples using Seeback effect) may be used to measure temperature of gaseous species, solid species, and/or other reaction materials. The measured temperature may be analyzed by, for example, comparison to desired temperatures (e.g., using a ruleset that correlates temperatures to process variables), and any discrepancies may be addressed by, for example, changing the energy and/or mass input. For example, temperature may be adjusted by adjusting the microwave power input to the system as shown in FIG. 6A. In another example, temperature may be adjusted by adjusting the coupling of the microwave energy to the process gas, as shown in FIG. 6B.

In another example, pressure sensors (e.g., pressure transducers such as those utilizing variable capacitance) may be utilized for safe operation of the system as well as process control. Specifically, various system components may be rated to operate at specified pressure ranges. However, the pressure may exceed the operational limits such as when one or more gas flow paths are clogged by solid material (e.g., carbon products). Similarly, pressure impacts the breakdown voltage of different ionizing gasses as defined by Paschen's Law, and may control or determine properties of the generated plasma. Specifically, collision frequency of electrons with heavy process gas in the plasma increases with higher pressure. This impacts both temperature of the gas and distribution of excited species within the plasma, and in turn impact the product composition of the product formed in the system. The measured pressure may, therefore, be used to control the opening or closing of pressure valves of the system to increase or decrease the pressure within various components (e.g., opened to relieve excess pressure when the measured pressure exceeds a threshold pressure, or vice versa).

The plasma conversion process may also be non-invasively monitored in-situ and in real-time using, for example, optical emission spectrometer. For example, multi-functional ports on the reaction zone (or other components of the system) may be instrumented with optical fiber cables attached to an optical emission spectrometer. Spectral data (composite of emission and blackbody) may be collected throughout the duration of plasma processing at several different exposures to ensure a high dynamic range. The collected spectral data may be processed by the controller to extract emission peaks and blackbody temperature from the spectra. Processing of the spectral data may include application of instrument response factor corrections to the captured spectra, identification of peaks at pre-specified wavelengths corresponding to emissions from certain species (e.g. $CH_3^*$, $Ar^*$, $CO^*$, etc.), and/or estimation of black body temperatures using, for example, a two-photon statistical technique for extracting bulk temperature from the blackbody emission spectrum of a hot object. Other processing methodologies are within the scope of this disclosure. The processing and analysis of the spectral data may be used to, for example, confirm the presence of oxidizing species (eg: CO, O*) in the plasma that are required for etching carbon materials such as carbon fiber; determine the location of solid carbon formation within the reaction chamber by measuring volumetric temperature profile (1500-2500 C) of the reactor's gas stream using blackbody emission (highest intensity plasma regions where solid carbon is formed have a lower blackbody temperature compared to surrounding regions); confirm, based on blackbody emission, near-instantaneous heating of solid materials to >1500° C. when microwave energy is directly coupled with the conductive material; or the like. Data extracted from the emission spectrum may, therefore, be used to control microwave power input, gas type, and flow rate which may impact process parameters (e.g., gas/material temperature profiles and/or velocity, electron/ion density, temperature, etc.) as well as process metrics (e.g., conversion rate, energy requirement, product selectivity, etc.).

In some embodiments, the effluent exiting the reaction zone may be analyzed using gas chromatography (via, slip-stream) to measure key process indicators including, without limitation, feedstock conversion, energy requirement, and product selectivity (i.e., types of product formed and composition). After the effluent analyte is quantified using gas chromatography, product selectivity and conversion of feedstock can be computed using knowledge of the input feedstock composition. Conversion and power input can then be used to compute the energy requirement for controlling the process variables for obtaining a desired output or desired process conditions within the system.

Additionally and/or alternatively, the effluent exiting the reaction zone may also be qualitatively analyzed using gas mass spectrometry (via, slip-stream) to identify species in the effluent such as water, ammonia, hydrogen sulfide, etc. (e.g., species that cannot be identified using gas chromatography. Mass spectrometry may also be used to qualitatively analyze minute amounts of species in the effluent (e.g., ppm amounts), study reaction kinetics by analyzing components sampled from various locations in the reaction zone, etc. and control such species formation and/or reaction kinetics by varying the input parameters in the system. Product composition data derived using mass spectrometry may, therefore, be used to control microwave power input, gas type and/or flow rate, fluidization height and/or rate, which may in turn control product selectivity and/or composition.

Figure 7:
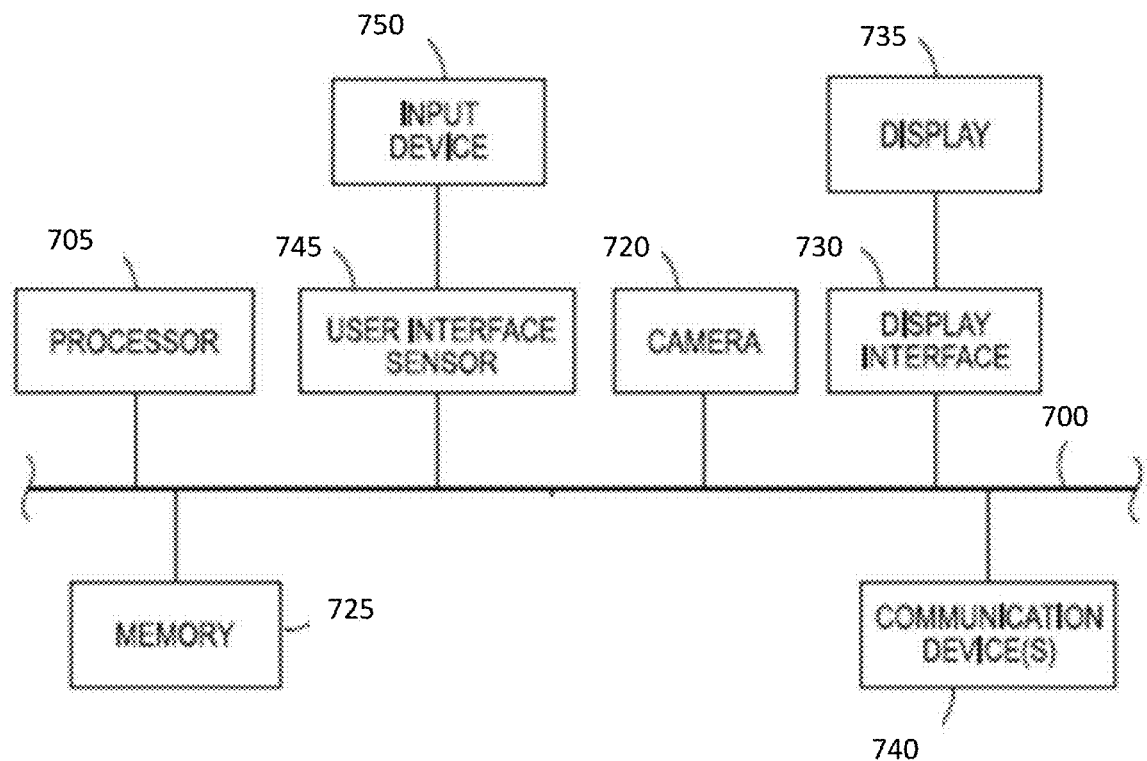
FIG. 7 illustrates example components of a controller that may implement various embodiments described in this document.

FIG. 7 depicts an example of internal hardware that may be included in any of the electronic components of the system, such as in the controller, in a computing device, etc. One or more conductive buses 700 serve as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication systems. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from an imaging device 720, such as a camera or scanner, that can capture video and/or still images.

Terminology that is relevant to this disclosure includes:

A "controller" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of such devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. The devices also may include appliances and other devices that can communicate in an Internet-of-things arrangement, such as smart thermostats, refrigerators, connected light bulbs and other devices. Additional elements that may be included in controllers are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

It should be noted that while the current description provides an overall structure and example dimensions, flow velocities, etc. of a reactor system, the disclosure is not limited to the disclosed values and may be reasonably scaled up or down without deviating from the principles of this disclosure. Specifically, the disclosed systems and methods are suitable for reasonable design, easy operation, and easy scale-up at any level (e.g., semi-industrial, industrial, etc.).

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Microwave radiation is utilized to generate a non-thermal plasma including streamers to facilitate the conversion of the precursor material(s) to the product(s) while minimizing carbon build up and/or energy consumption. In one embodiment, the streamers enable the same (or higher) conversion rates and/or product selectivity than prior processes (e.g., thermal plasma) with a lower microwave radiation density within the reaction zone than the prior processes.

It will be appreciated that, although specific embodiments have been described herein for purposes of illustration, various modifications may be made without departing from the spirit and scope of the embodiments. In particular, the vessel may be configured in a variety of flow configurations and orientations. For example, the first conduit may be in communication with a proximal side of the vessel that is oppositely positioned to a distal side of the vessel that the second conduit is in communication with. Accordingly, the scope of protection of these embodiments is limited only by the following claims and their equivalents.

What is claimed is:

1. A system for plasma treatment of a fluidized bed of particles, the system comprising:
    an energy coupling zone configured to generate a plasma from microwave radiation;
    an interface element configured to propagate the plasma from the energy coupling zone to a reaction zone;
    a fluidization chamber configured for holding and fluidizing a plurality of reactant particles;
    a perforated distributor;
    one or more fluidization gas ports for receiving a fluidization gas; and
    the reaction zone configured to receive the plasma, wherein the reaction zone is further configured to:
        receive, from the fluidization assembly positioned below the reaction zone, the plurality of reactant particles in a fluidization plane, a direction of the fluidization plane being substantially perpendicular to a direction of propagation of plasma in the reaction zone, and
        form a product in presence of the plasma.

2. The system of claim 1, wherein the energy coupling zone comprises:
    a radiation source for providing the microwave radiation; and
    a discharge tube coupled to the radiation source, the discharge tube configured to:
        receive a plasma forming material, and generate the plasma from the plasma forming material in presence of the microwave radiation.

3. The system of claim 2, wherein the discharge tube extends at least partially within the interface element.

4. The system of claim 1, wherein a length of the interface element is configured such that a head of the plasma is propagated within the reaction zone.

5. The system of claim 1, wherein the one or more fluidization ports are in fluid communication with the perforated distributor such that the fluidization gas may fluidize static reactant particles.

6. The system of claim 1, wherein the one or more fluidization ports are located on one or more walls of the fluidization chamber to provide a tangential flow of the fluidization gas.

7. The system of claim 1, wherein the perforated distributor is a mesh.

8. The system of claim 1, wherein the perforated distributor is a fritted disc.

9. The system of claim 1, wherein the fluidization assembly further comprises a spouting tube configured to receive a spouting gas, the spouting tube comprising;
    a plurality of holes; and
    a spouting end configured to recirculate the plurality of reactant particles in the reaction zone.

10. The system of claim 9, wherein the plurality of holes are configured to receive the plurality of reaction material particles from a fluidized bed formed within the fluidization chamber.

11. The system of claim 1, further comprising an exhaust assembly comprising a conduit for receiving an exhaust gas from the reaction zone.

12. A method for plasma treatment of a fluidized bed of particles, the method comprising:
    generating a layered plasma from microwave radiation, the layered plasma comprising a higher temperature plasma surrounded by a lower temperature plasma;
    propagating the plasma into a reaction zone;
    receiving, in the reaction zone, a plurality of reactant particles in a fluidization plane, a direction of the fluidization plane being substantially perpendicular to a direction of propagation of plasma in the reaction zone; and forming a product in presence of the plasma.

13. The method of claim 12, further comprising fluidizing, using a fluidization gas and a perforated distributor, static reactant particles in the fluidization plane.

14. The method of claim 13, further comprising selecting a gas flow velocity of the fluidization gas for controlling a residence time of the plurality of reactant particles within the plasma.

15. The method of claim 12, further comprising recirculating one or more of the plurality of reactant particles into the reaction zone using a spouting gas.

16. The method of claim 12, further comprising eliminating, via an exhaust assembly, an exhaust gas from the reaction zone.

17. The method of claim 12, further comprising:
collecting sensor data; and
using feedback control to control one or more process conditions.

18. The method of claim 17, wherein collecting the sensor data comprises collecting the sensor data from at least one of the following: temperature sensors, pressure sensors, optical emission spectrometers, or gas chromatographs, or gas mass spectrometers.

19. A method for plasma treatment of a fluidized bed of particles, the method comprising:
generating a plasma from microwave radiation;
propagating the plasma into a reaction zone;
fluidizing, using a fluidization gas and a perforated distributor, static reactant particles in the fluidization plane;
receiving, in the reaction zone, a plurality of reactant particles in the fluidization plane, a direction of the fluidization plane being substantially perpendicular to a direction of propagation of plasma in the reaction zone; and
forming a product in presence of the plasma.

20. The method of claim 19, further comprising selecting a gas flow velocity of the fluidization gas for controlling a residence time of the plurality of reactant particles within the plasma.

21. The method of claim 19, further comprising recirculating one or more of the plurality of reactant particles into the reaction zone using a spouting gas.

22. The method of claim 19, further comprising eliminating, via an exhaust assembly, an exhaust gas from the reaction zone.

23. The method of claim 19, further comprising:
collecting sensor data; and
using feedback control to control one or more process conditions.

24. The method of claim 23, wherein collecting the sensor data comprises collecting the sensor data from at least one of the following: temperature sensors, pressure sensors, optical emission spectrometers, or gas chromatographs, or gas mass spectrometers.

25. A method for plasma treatment of a fluidized bed of particles, the method comprising:
generating a plasma from microwave radiation;
propagating the plasma into a reaction zone;
receiving, in the reaction zone, a plurality of reactant particles in the fluidization plane, a direction of the fluidization plane being substantially perpendicular to a direction of propagation of plasma in the reaction zone;
recirculating one or more of the plurality of reactant particles into the reaction zone using a spouting gas; and
forming a product in presence of the plasma.

26. The method of claim 25, further comprising eliminating, via an exhaust assembly, an exhaust gas from the reaction zone.

27. The method of claim 25, further comprising:
collecting sensor data; and
using feedback control to control one or more process conditions.

28. The method of claim 27, wherein collecting the sensor data comprises collecting the sensor data from at least one of the following: temperature sensors, pressure sensors, optical emission spectrometers, or gas chromatographs, or gas mass spectrometers.

29. A method for plasma treatment of a fluidized bed of particles, the method comprising:
generating a plasma from microwave radiation;
propagating the plasma into a reaction zone;
receiving, in the reaction zone, a plurality of reactant particles in the fluidization plane, a direction of the fluidization plane being substantially perpendicular to a direction of propagation of plasma in the reaction zone;
forming a product in presence of the plasma;
collecting sensor data; and
using feedback control to control one or more process conditions.

30. The method of claim 29, wherein collecting the sensor data comprises collecting the sensor data from at least one of the following: temperature sensors, pressure sensors, optical emission spectrometers, or gas chromatographs, or gas mass spectrometers.

* * * * *